United States Patent [19]
Braun et al.

[11] Patent Number: 6,075,647
[45] Date of Patent: Jun. 13, 2000

[54] OPTICAL SPECTRUM ANALYZER HAVING TUNABLE INTERFERENCE FILTER

[75] Inventors: David M. Braun, Santa Rosa; Timothy L. Bagwell, Rohnert Park, both of Calif.

[73] Assignee: Hewlett-Packard Company, Palo Alto, Calif.

[21] Appl. No.: 09/016,235

[22] Filed: Jan. 30, 1998

[51] Int. Cl.[7] .............................. G02B 27/00; G02B 5/30; G01N 21/25
[52] U.S. Cl. .......................... 359/578; 359/484; 359/487; 359/495; 359/497; 356/416
[58] Field of Search .................................. 359/578, 579, 359/502, 483, 484, 485, 487, 494, 495, 497, 498; 356/416, 420

[56] References Cited

U.S. PATENT DOCUMENTS

| | | | |
|---|---|---|---|
| 4,813,756 | 3/1989 | Frenkel et al. | 385/73 |
| 5,278,929 | 1/1994 | Tanisawa et al. | 385/93 |
| 5,287,214 | 2/1994 | Robertson et al. | 359/578 |
| 5,321,539 | 6/1994 | Hirabayashi et al. | 359/578 |
| 5,481,402 | 1/1996 | Cheng et al. | 359/578 |
| 5,666,225 | 9/1997 | Colbourne | 359/578 |
| 5,684,632 | 11/1997 | Shimizu | 359/578 |
| 5,710,655 | 1/1998 | Rumbaugh et al. | 359/249 |
| 5,781,332 | 7/1998 | Ogata | 359/578 |
| 5,781,341 | 7/1998 | Lee | 359/578 |

*Primary Examiner*—Cassandra Spyrou
*Assistant Examiner*—John Juba, Jr.
*Attorney, Agent, or Firm*—John L. Imperato

[57] ABSTRACT

An optical spectrum analyzer includes a polarization modifier that eliminates polarization-dependent wavelength spreading, enabling the analyzer to have high signal selectivity and high measurement sensitivity. The polarization modifier spatially separates orthogonal polarization components of the applied optical signal into separate optical beams and rotates the relative polarization components of the beams so that the beams are incident on a tunable interference filter in a multipass configuration at a single polarization state. The optical beams are directed through regions of the interference filter which lie on a contour of substantially equal center wavelength so that each of the multiple passes through the interference filter provides for corresponding narrowing of the filter bandwidth. Narrow bandwidth and low insertion loss are maintained over a wide tuning range by tilting the interference filter about a tilt axis intercepting the regions of the interference filter that lie on a contour of substantially equal optical thickness.

10 Claims, 8 Drawing Sheets

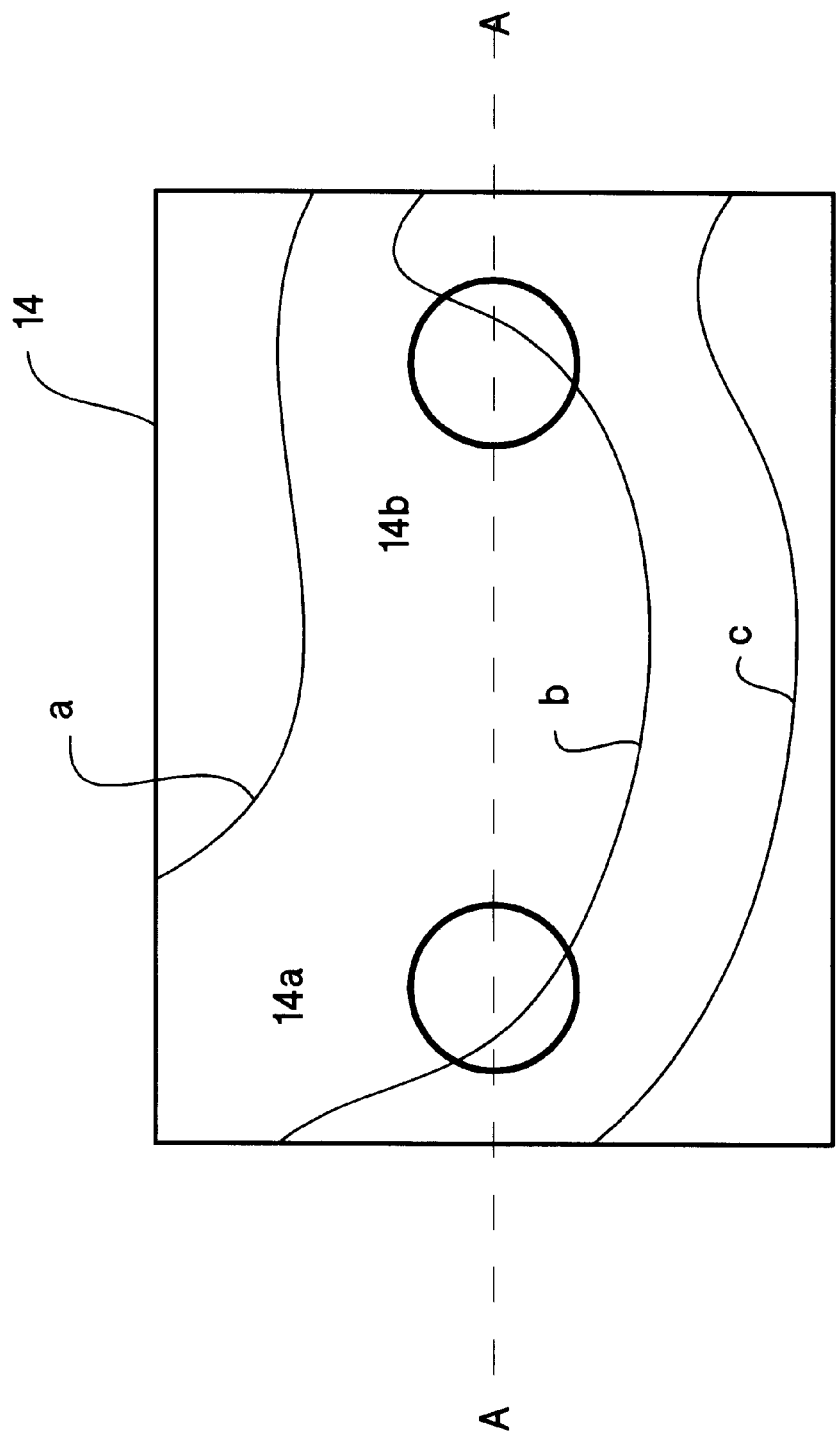

OPTICAL SPECTRUM ANALYZER HAVING TUNABLE INTERFERENCE FILTER

BACKGROUND OF THE INVENTION

Critical performance parameters of optical spectrum analyzers (OSAS), such as signal selectivity and measurement sensitivity, depend on the characteristics of optical filters within the OSAs. Optical filters having narrow bandwidth, low insertion loss and wide tuning range are advantageous, enabling OSAs to test complex optical signals, such as those within dense wavelength division multiplexed (DWDM) optical telecommunication systems. Presently available OSAs use optical filters having center wavelengths that are tuned by varying the tilt angle of an interference filter relative to the beam of the applied optical signal. However, the filter's center wavelength depends on the polarization state of the applied optical signal and as the tilt angle of the interference filter varies, the filter bandwidth and insertion loss increase, making the OSA unsuitable for measuring optical signals within a DWDM telecommunication system.

SUMMARY OF THE INVENTION

An optical spectrum analyzer constructed according to the preferred embodiments of the present invention includes a polarization modifier that eliminates polarization-dependent wavelength spreading, enabling the OSA to have high signal selectivity and high measurement sensitivity. The polarization modifier spatially separates orthogonal polarization components of the applied optical signal into separate optical beams and rotates the relative polarization components of the beams so that the beams are incident on a tunable interference filter in a multipass configuration at a single polarization state. The optical beams are directed to pass through regions of the interference filter which lie on a contour of substantially equal center wavelength so that each of the multiple passes through the interference filter provides for corresponding narrowing of the filter bandwidth. Narrow bandwidth and low insertion loss are maintained over a wide tuning range by tilting the interference filter about a tilt axis containing the regions of the interference filter that lie on a contour of substantially equal center wavelength. The optical spectrum analyzer is well suited for measuring complex optical signals, such as those present in dense wavelength division multiplexed telecommunication systems.

BRIEF DESCRIPTION OF THE DRAWINGS

FIG. 7 shows contours of substantially equal center wavelengths of an interference filter included in the optical spectrum analyzer constructed according to the preferred embodiments of the present invention.

DETAILED DESCRIPTION OF THE PREFERRED EMBODIMENTS

Figure 1:
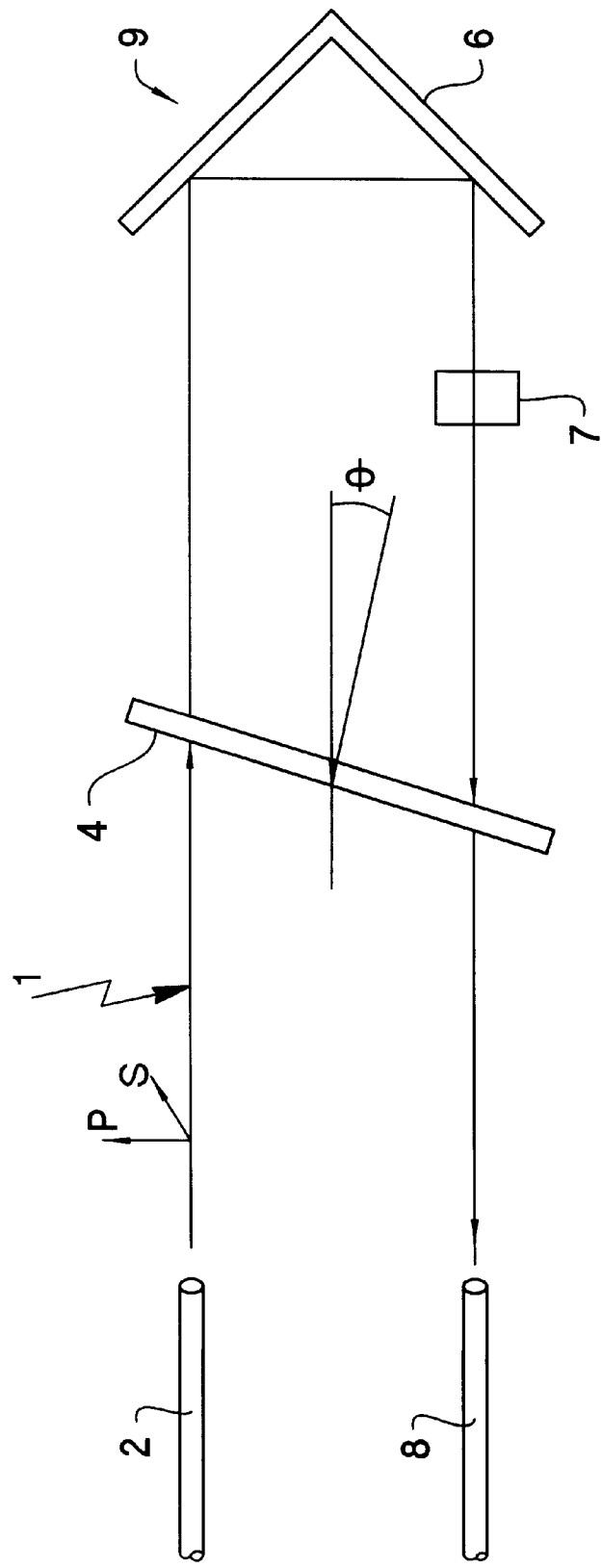
FIG. 1 shows a prior art optical spectrum analyzer.

FIG. 1 shows a prior art optical spectrum analyzer (OSA) 9 including an input fiber 2, tunable interference filter 4, retroreflector 6, half-wave retarder 7 and output fiber 8. A collimated optical input signal 1 having orthogonal polarization components (designated as the S and P polarization states), is incident on the tunable interference filter 4. The optical signal is then directed by the retroreflector 6 through another pass through the tunable interference filter 4 and to the output fiber 8. The half-wave retarder 7 rotates the S polarization state of the optical input signal 1 to the P polarization state and rotates the P polarization state of the optical input signal 1 to the S polarization state.

The tunable interference filter 4 has a center wavelength $\lambda_C$ that is tuned by varying a tilt angle $\theta$ between the interference filter 4 and the beam of the optical input signal 1. Optical spectrum analysis is performed by the OSA 9 by detecting the optical output signal at the output fiber 8 as the tilt angle $\theta$ of the tunable interference filter 4 is periodically varied over a prescribed range of tilt angles. The signal selectivity of the OSA 9 is determined by the bandwidth of the tunable interference filter 4.

Figure 2:
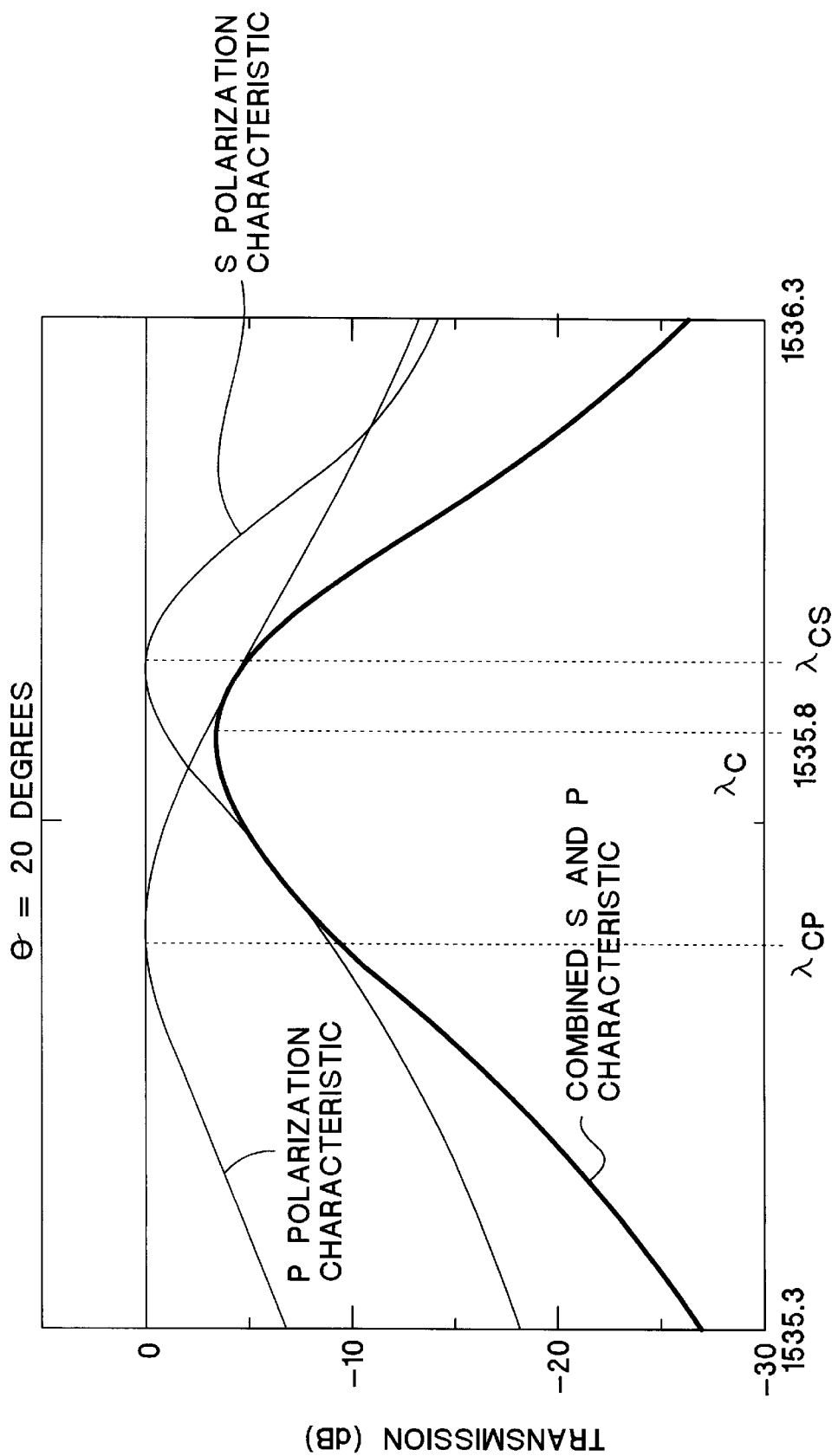
FIG. 2 shows bandwidth characteristics of a tunable interference filter included in the prior art optical spectrum analyzer.

FIG. 2 shows the bandwidth characteristics of the tunable interference filter 4, in the prior art OSA 9, for a tilt angle $\theta$ equal to 20 degrees. As the tilt angle $\theta$ deviates from 0 degrees, the center wavelength $\lambda_{CS}$ of the S-polarized component becomes different from the center wavelength $\lambda_{CP}$ of the P-polarized component. An increase in the tilt angle $\theta$ causes a corresponding increase in the difference between center wavelengths $\lambda_{CS}$, $\lambda_{CP}$ of the two polarization components. This difference in center wavelengths, or wavelength spreading, increases the bandwidth of the tunable interference filter 4. As the bandwidth increases, signal selectivity of the OSA 9 decreases, and when the signal selectivity becomes low enough, the OSA becomes unsuitable for measuring optical input signals from dense wavelength division multiplexed telecommunication systems which may require at least 40 dB filter rejection at 0.4 nm offsets from the center wavelength $\lambda_C$ of the tunable interference filter 4.

The bandwidth of the tunable interference filter 4 is further increased by nonuniformities in optical thickness inherent in the tunable interference filter 4. Generally, the optical thickness of the tunable interference filter 4 in the region of the first pass through the filter is not equal to the optical thickness of the tunable interference filter 4 in the region of the second pass through the interference filter. The unequal optical thickness further broadens the bandwidth of the tunable interference filter.

Another undesirable characteristic of the prior art OSA 9 is increased insertion loss (i.e. reduced transmission) of the tunable interference filter 4 caused by the center wavelength spreading of the S and P-polarization components and nonuniform optical thickness at different regions of the tunable interference filter 4. The increased insertion loss reduces the signal sensitivity of the OSA 9.

FIGS. 3, 4, 5a and 5b show optical spectrum analyzers (OSAs) constructed according to the preferred embodiments of the present invention. The OSAs in the preferred embodiments each include a polarization modifier 12 that separates orthogonal polarization components (designated as S and P polarization states) of an input optical signal 11 into two optical beams 11a, 11b. The polarization modifier 12 rotates relative polarization components of the beams 11a, 11b so that the beams are incident on an interference filter 14 in a single polarization state. Because the single polarization state is present in each of the multiple passes through the interference filter 14, wavelength spreading between S and P polarization components of the input optical signal 11 by the interference filter 14 is eliminated.

Figure 3:
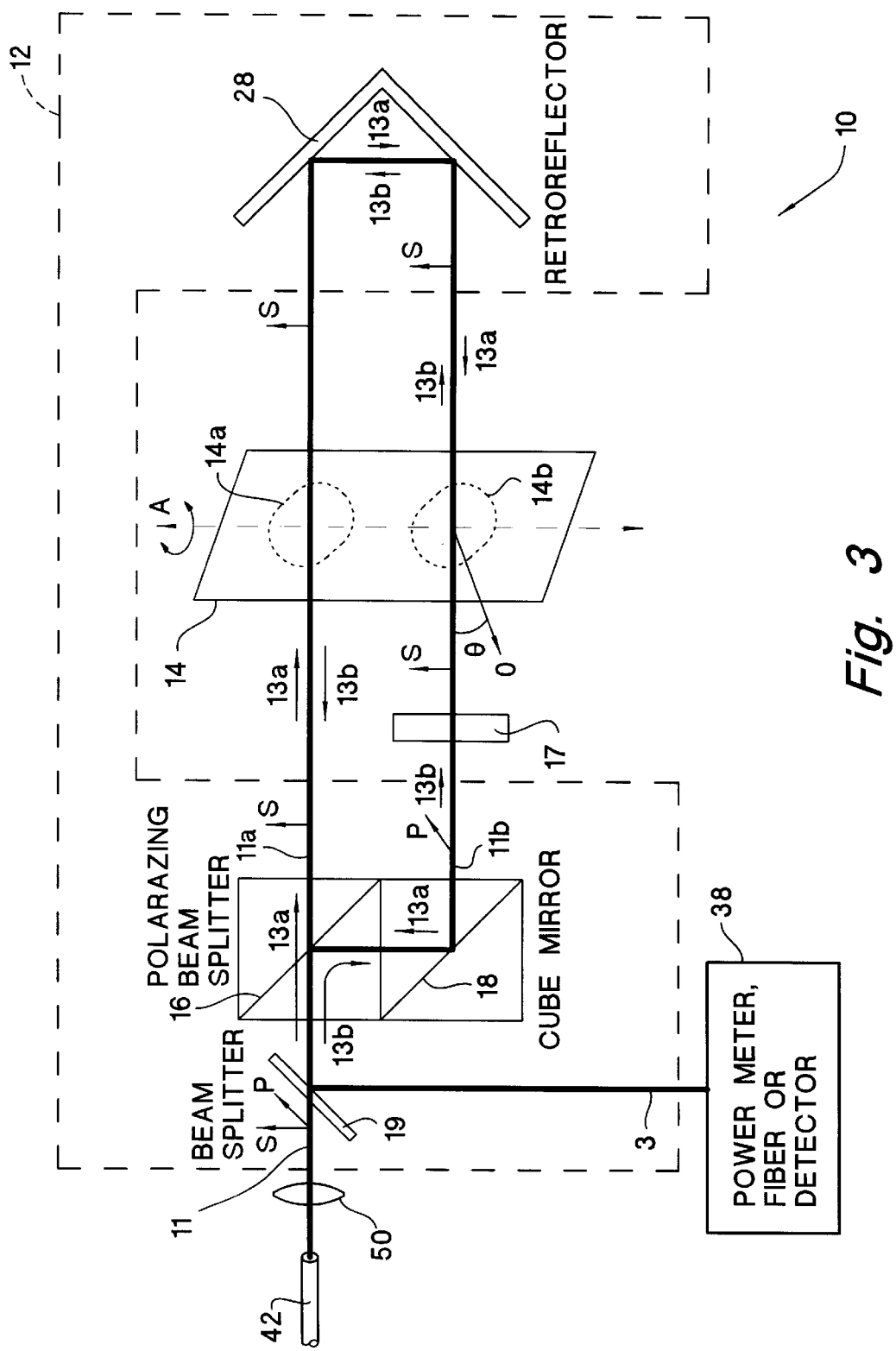
FIG. 3 shows an optical spectrum analyzer constructed according to a first preferred embodiment of the present invention.

FIG. 3 shows an optical spectrum analyzer (OSA) 10 constructed according to a first preferred embodiment of the present invention. The optical input signal 11 is supplied to the OSA 10 from a fiber 42. Typically, the input signal 11 is collimated by a lens 50. The collimated optical input signal 11 is incident on a beam splitter 19 and then a polarizing beam splitter 16 which directs the S-polarized component S of the input signal 11 into a first beam 11a propagating along a first optical path 13a (shown as the clockwise path) and directs the P-polarized component P of the input signal 11 into a second beam 11b propagating along a second optical path 13b (shown as the counterclockwise path).

The S-polarized beam S, emerging from the polarizing beam splitter 16 as the first beam 11a, is incident on a first region 14a of the interference filter 14 and then a retroreflector 28, which directs the S-polarized beam S to a second region 14b of the interference filter 14. After this second pass through the interference filter 14, the S-polarized component in the first optical path 13a is incident on a half-wave plate 17 which rotates the S-polarized component S to the P polarization state. After polarization rotation by the half-wave plate 17 occurs, a cube mirror 18 and the polarizing beam splitter 16 direct the P-polarized beam P to the beam splitter 19 which redirects the P-polarized beam P to an output path 3.

The P-polarized component P of the optical input signal 11 in the second beam 11b is directed along the second optical path 13b by the polarizing beam splitter 16 and the cube mirror 18 to the half-wave plate 17 which rotates the P polarization component to the S polarization state. The resulting S-polarized beam S is then incident on the second region 14b of the interference filter 14. After passing through the interference filter 14 at the second region 14b, the S-polarized beam is incident on the retroreflector 28 which directs the S-polarized beam through the first region 14a of the interference filter 14. After this second pass through the interference filter 14, the S-polarized beam is incident on the polarizing beam splitter 16 which directs the S-polarized beam toward the beam splitter 19. The beam splitter 19 then directs this P-polarized beam to the output path 3. The P-polarized beam and the S-polarized beam are combined at the output path 3 and are intercepted by a fiber, power meter or optical detector 38.

Spectrum analysis of the optical input signal 11 is performed by intercepting the combined beam in the output path 3 as the center wavelength $\lambda_C$ of the interference filter 14 is tuned by rotating the interference filter about a tilt axis A over a prescribed range of tilt angles θ, formed between the optical beam 11a, 11b and an axis o which is orthogonal to the planar surfaces of the interference filter 14.

Figure 4:
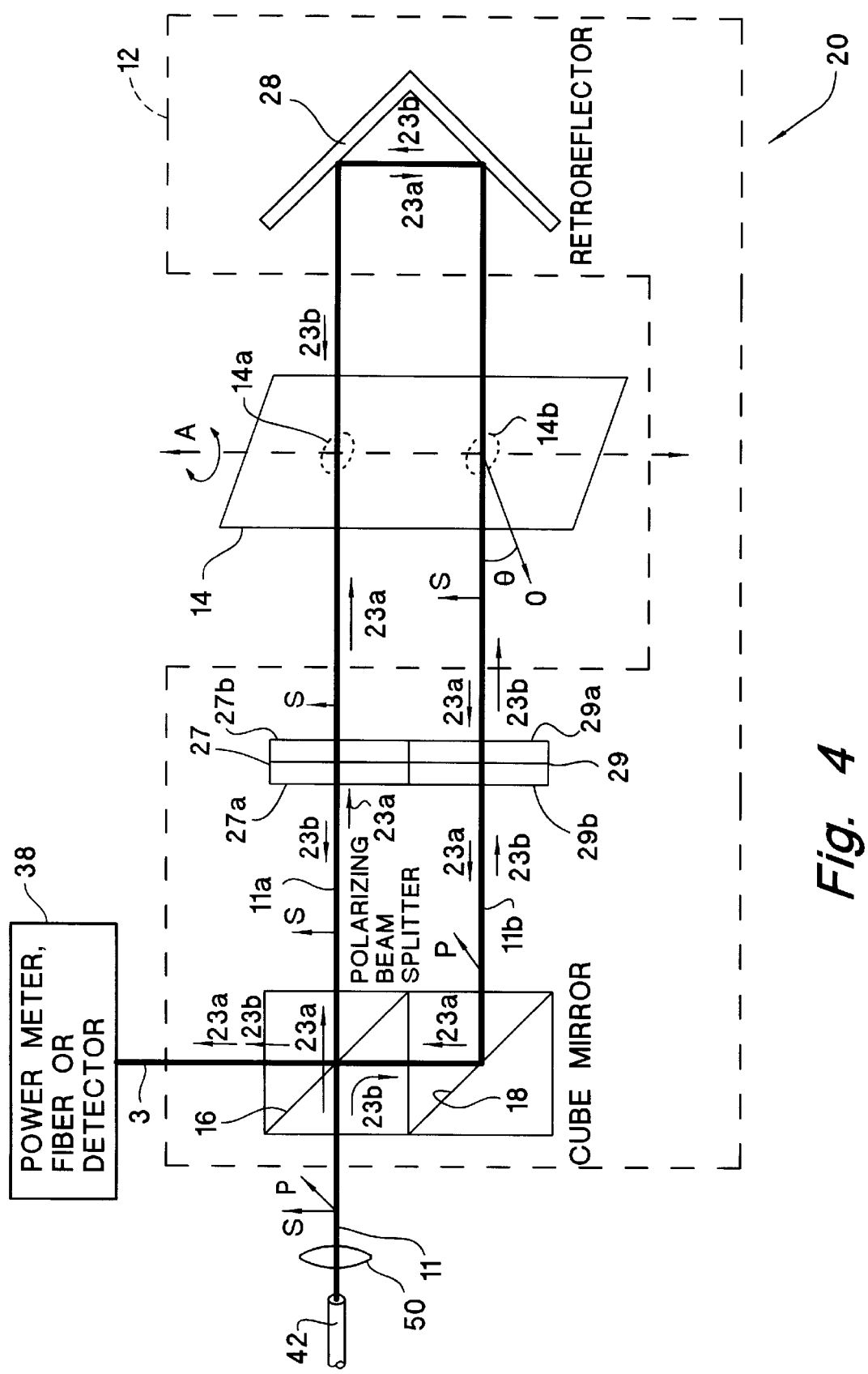
FIG. 4 shows an optical spectrum analyzer constructed according to a second preferred embodiment of the present invention.

FIG. 4 shows an optical spectrum analyzer (OSA) 20 constructed according to a second preferred embodiment of the present invention. The optical input signal 11 supplied to the OSA 20 by a fiber 42 is typically collimated by a lens 50. The collimated signal 11 is incident on a polarizing beam splitter 16 which directs an S-polarized component S of the input signal 11 into a first beam 11a propagating along a first optical path 23a (shown as the clockwise path) and directs the P-polarized component P of the input signal 11 into a second beam 11b propagating along a second optical path 23b (shown as the counterclockwise path).

The S-polarized component S in the first optical path 23a is incident on a first nonreciprocal polarization rotator 27, such as a Faraday rotator in combination with a wave plate, which has the characteristic of maintaining the polarization, i.e. not rotating polarization, when the direction of propagation is from a first surface 27a through the nonreciprocal rotator 27 and to the second surface 27b (corresponding to the first optical path 23a) and rotating the polarization state of an applied optical signal by 90 degrees when the direction of propagation of the applied optical signal is from the second surface 27b through the nonreciprocal rotator 27 and to the first surface 27a (corresponding to the second optical path 23b). Thus, the polarization of the S-polarized component S in the first beam 11a, propagating from the polarizing beam splitter 16 to an interference filter 14, is maintained in the S polarization state through the first nonreciprocal rotator 27. This S-polarized beam S is incident on a first region 14a of the interference filter 14 and then a retroreflector 28 which directs this S-polarized beam to a second region 14b of the interference filter. After this second pass through the interference filter 14, the S-polarized beam S is incident on a second nonreciprocal polarization rotator 29, such as a Faraday rotator in combination with a wave plate, which has the characteristic of maintaining the polarization, i.e. not rotating polarization, when the direction of propagation is from a first surface 29a through the nonreciprocal polarization rotator 29 and to a second surface 29b (corresponding to the first optical path 23a) and rotating the polarization state of an applied optical signal by 90 degrees when the direction of propagation of the applied optical signal is from the second surface 29b through the nonreciprocal rotator 29 and to the first surface 29a (corresponding to the second optical path 23b). Thus, the polarization of the S-polarized component S propagating along path 23a from the interference filter 14 to a cube mirror 18, is maintained in the S polarization state through the second nonreciprocal rotator 29. The cube mirror 18 directs the resulting S-polarized beam to an output path 3.

The P-polarized component of the optical input signal 11 in the second beam 11b is directed along the second optical path 23b from the polarizing beam splitter 16 to the cube mirror 18. The P-polarized component is then incident on the second nonreciprocal polarization rotator 29 which rotates the polarization state from the P polarization state to the S polarization state. The resulting S-polarized beam S is then incident on the second region 14b of the interference filter 14. After passing through the second region 14b, the retroreflector 28 directs the S-polarized beam through the first region 14a of the interference filter 14. After this second pass through the interference filter 14, the S-polarized beam is rotated to the P polarization state by the first nonreciprocal rotator 27 and is incident on the polarizing beam splitter 16 which directs this P-polarized beam to the output path 3.

The P-polarized beam and the S-polarized beam are combined at the output path 3 and are intercepted by a fiber, power meter or optical detector 38. Spectrum analysis of the optical input signal 11 is performed by intercepting the combined beams in the output path 3 as the center wavelength $\lambda_C$ of the interference filter 14 is tuned by rotating the interference filter about a tilt axis A over a prescribed range of tilt angles θ, formed between the optical beams 11a, 11b and an axis ○ which is orthogonal to the planar surfaces of the interference filter 14.

Figure 5A:
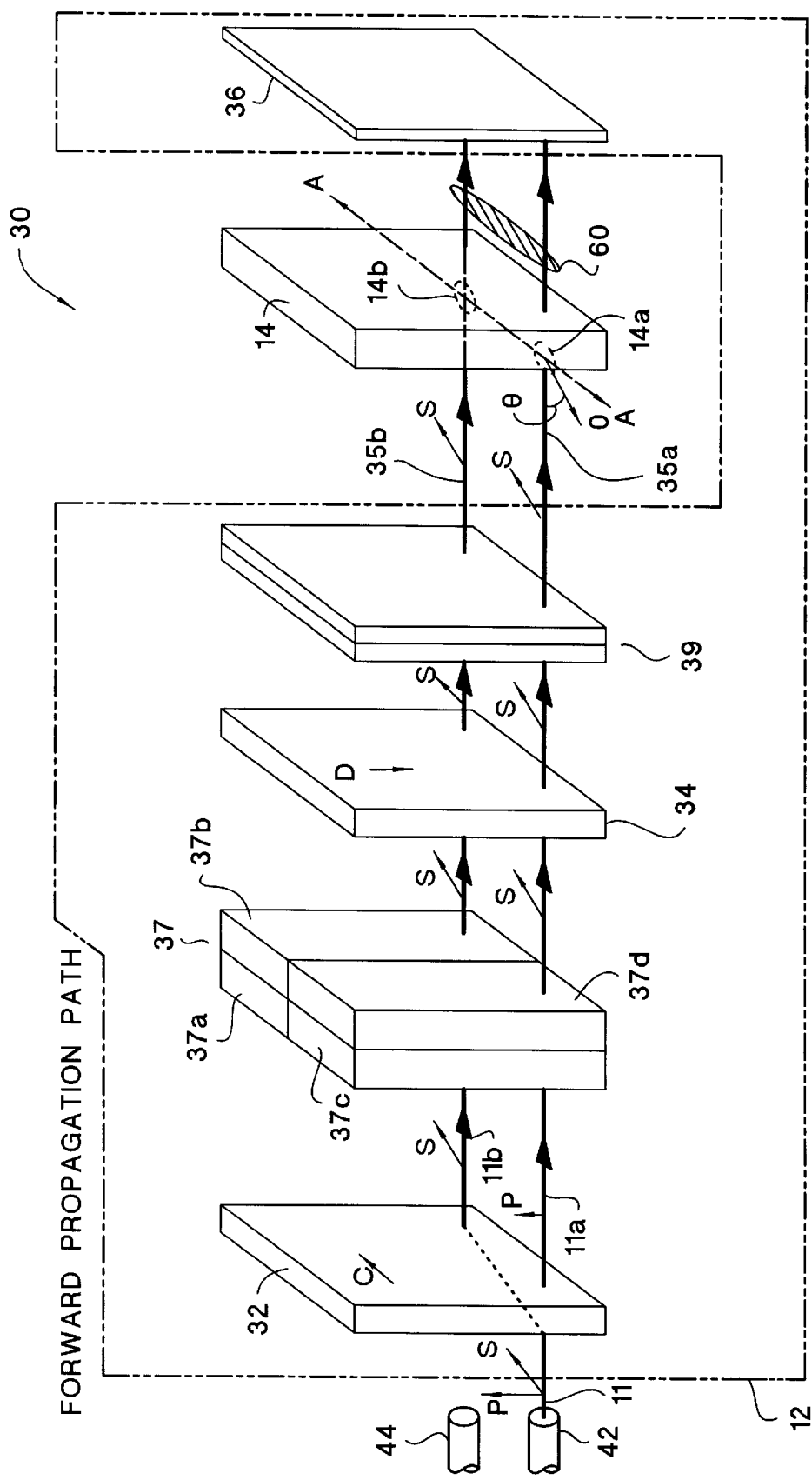
FIGS. 5a and 5b show an optical spectrum analyzer constructed according to a third preferred embodiment of the present invention.
Figure 5B:
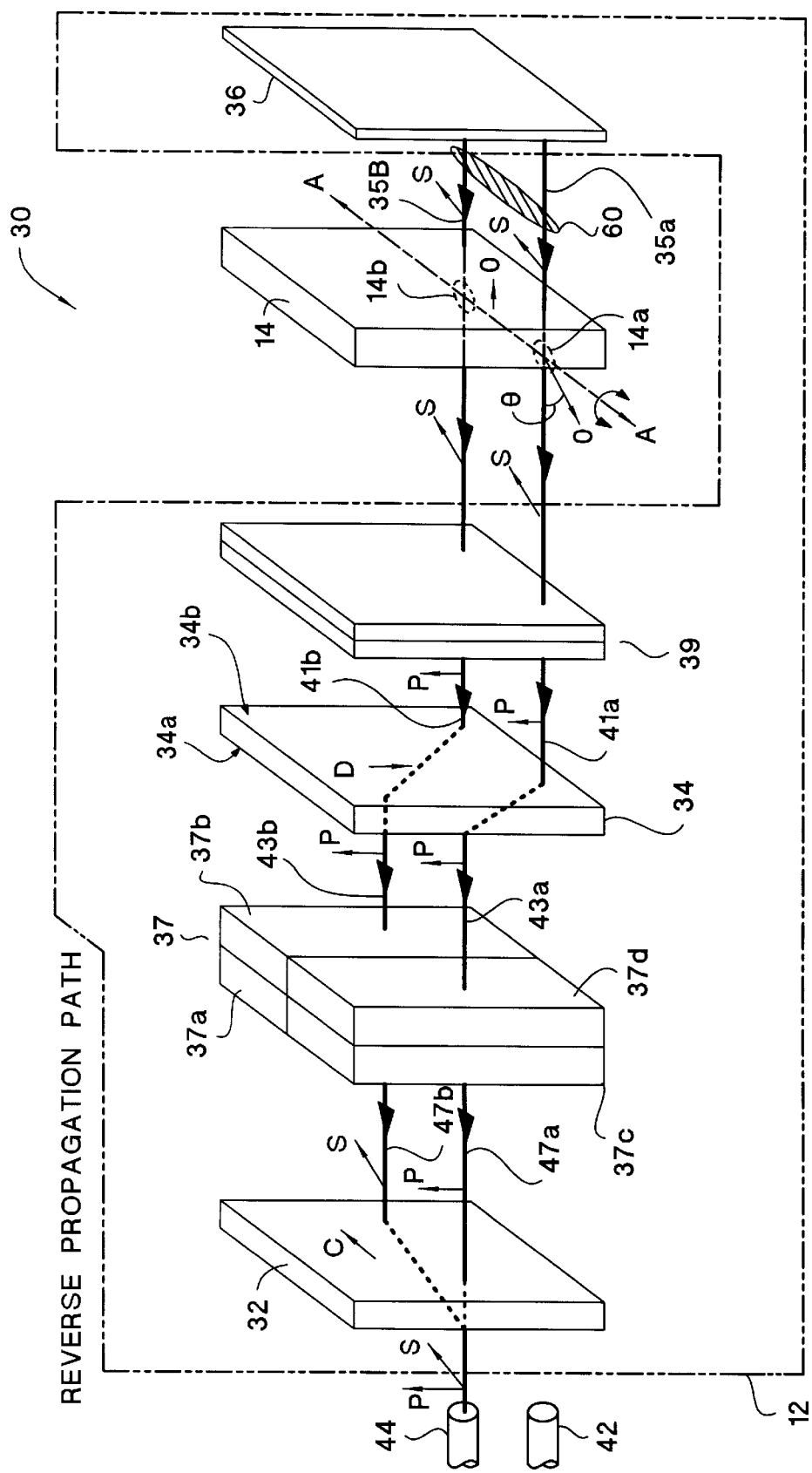

FIGS. 5a and 5b show an optical spectrum analyzer (OSA) 30 constructed according to a third preferred embodiment of the present invention. A forward propagation path and a reverse propagation path of optical signals within the OSA 30 are shown separately to provide clarity. In the forward propagation path shown in FIG. 5a, the optical input signal 11 supplied by a fiber 42 is typically collimated by a lens (not shown) placed between the fiber 42 and a walk-off crystal 32. The collimated optical input signal 11 is incident on the first walk-off crystal 32. In the first walk-off crystal 32, optical signals polarized orthogonal to a walk-off axis C (in this example the P-polarized component) emerge from the walk-off crystal 32 collinear with the incident optical signal 11 in a first beam 11a. Optical signals polarized parallel to the walk-off axis C (in this example the S-polarized component) emerge from the first walk-off crystal 32 spatially offset from the incident optical signal 11 in a second beam 11b.

The first beam 11a is incident on a first portion of a first nonreciprocal rotator 37, such as a Faraday rotator in combination with a wave plate, which rotates the polarization state of an applied optical signal by 90 degrees when the direction of propagation of the applied optical signal is from a first surface 37c, through the nonreciprocal rotator 37 to a second surface 37d. Polarization is maintained (not rotated) when the direction of propagation is from the second surface 37d through the nonreciprocal rotator 37 to the first surface 37c. The second beam 11b is incident on a second portion of the first nonreciprocal rotator 37 which rotates the polarization state of an applied optical signal by 90 degrees when the direction of propagation of the applied optical signal is from a second surface 37b, through the nonreciprocal rotator 37 to a first surface 37a. Polarization is maintained (not rotated) when the direction of propagation is from the first surface 37a, through the nonreciprocal rotator 37 to the second surface 37b. Thus, the polarization state of the first beam 11a in the forward propagation path is rotated from the P polarization state to the S polarization state by the first portion of the first nonreciprocal rotator 37. The polarization state of the second beam 11b is maintained in the S polarization state by the second portion of the first nonreciprocal rotator 37. The S-polarized beams emerge from the first nonreciprocal rotator 37 and are incident on a second walk-off crystal 34. Since the polarization of the incident beams are orthogonal to a walk-off axis D of the second walk-off crystal 34, the S-polarized beams emerge collinear with the incident beams and are then incident on a second nonreciprocal rotator 39.

In the forward propagation path, the polarization state of the S-polarized beams are maintained (not rotated) through the second nonreciprocal rotator 39. The S-polarized beam 35a is then incident on a first region 14a of an interference filter 14 and the S-polarized beam 35b is incident on a second region 14b of the interference filter 14. The S-polarized beams 35a, 35b reflect off a reflector 36 and the beams propagate along the reverse propagation path shown in FIG. 5b. The S-polarized beam 35a is re-transmitted through the first region 14a of the interference filter 14 and the S-polarized beam 35b is re-transmitted through the second region 14b of the interference filter 14. The S-polarized beams are then incident on the second nonreciprocal rotator 39 which in the reverse propagation path, rotates the polarization state of the S-polarized beams from the S polarization state to the P polarization state. The resulting P-polarized beams 41a, 41b are incident on the second walk-off crystal 34. Since the polarization states of the P-polarized beams are parallel to the walk-off axis D, the beams emerging from the first surface 34a of the second walk-off crystal are spatially offset from the beams 41a, 41b incident on the second surface 34b of the second walk-off crystal 34. The offset beam 43a is incident on the first portion of the first nonreciprocal rotator which maintains the P polarization state in the reverse propagation path. The offset beam 43b is incident on the second portion of the first nonreciprocal rotator which rotates the polarization from the P polarization state to the S polarization state in the reverse propagation path.

The S-polarized beam 47b and the P-polarized beam 47a are incident on the first walk-off crystal 32. The P-polarized beam 47a, being perpendicular to the walk-off axis C of the first walk-off crystal 32 emerges in alignment with an output fiber 44, and the S-polarized beam 47b, being parallel to the walk-off axis C, emerges offset from the incident S-polarized beam 47b so that it is also aligned with the output fiber 44. The output fiber 44 intercepts the S-polarized signal and the P-polarized signal and combines the signals provided by the first walk-off crystal 32.

Spectrum analysis of the optical input signal 11 is performed by intercepting the combined beam at the output fiber 44 as the center wavelength $\lambda_C$ of the interference filter 14 is tuned by rotating the interference filter about a tilt axis A over a prescribed range of tilt angles θ, formed between the optical beams 35a, 35b and an axis ○ which is orthogonal to the planar surfaces of the interference filter 14. When thermally expanded core (TEC) fibers, such as those described by Tanisawa et al. in U.S. Pat. No. 5,278,929, are used for input fiber 42 and optical fiber 44, a compact OSA 30 results. The TEC fibers enable a single collimating lens 60, positioned between the interference filter 14 and the reflector 36, to be used in place of two separate collimating lenses (not shown) positioned between the fibers 42, 44 and the first walk-off crystal 32.

Figure 6:
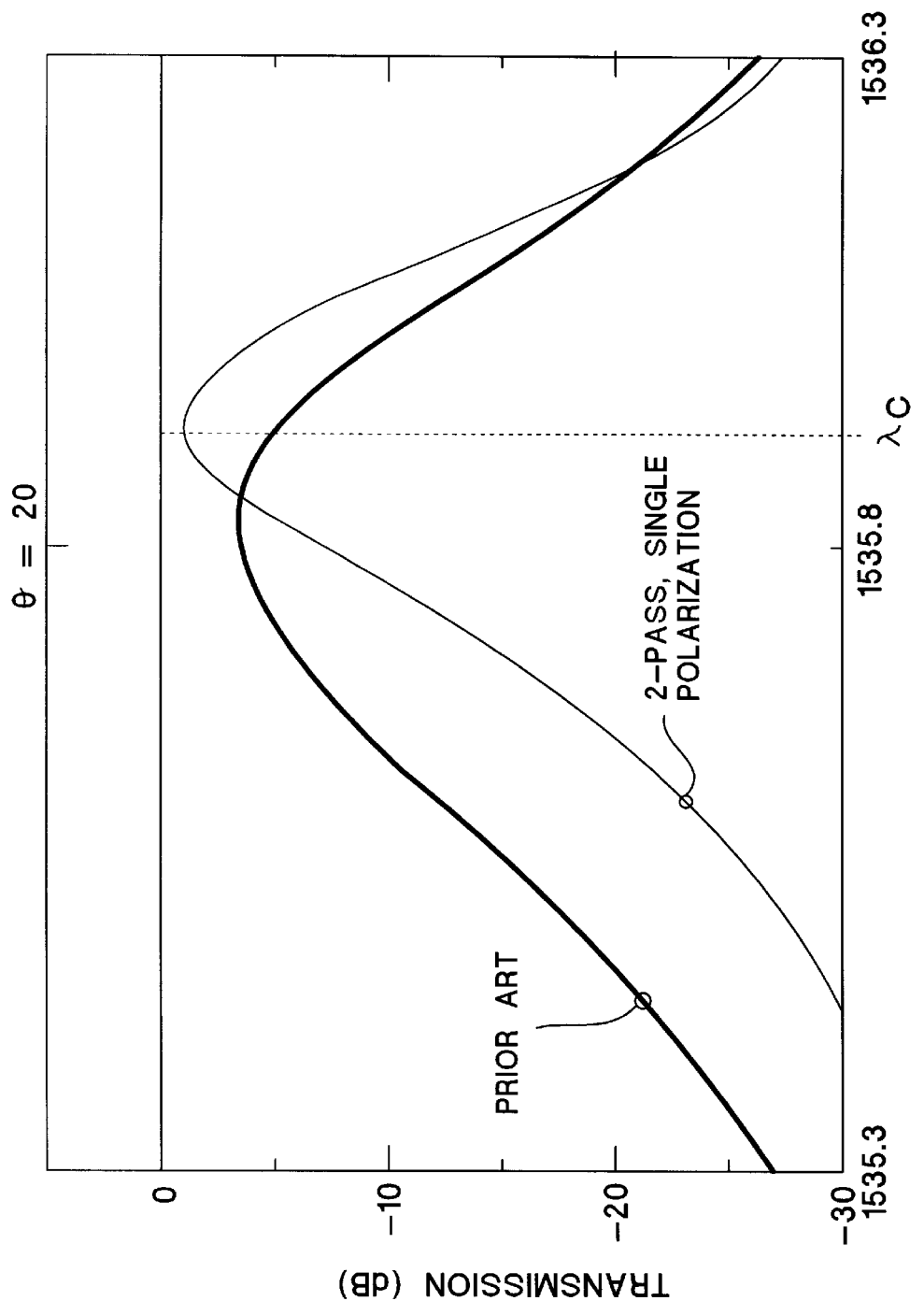
FIG. 6 shows the bandwidth characteristics of an optical spectrum analyzer constructed according to the preferred embodiments of the present invention.

FIG. 6 shows the narrow bandwidth characteristics of the OSAs 10, 20, 30 constructed according to the preferred embodiments of the present invention, in comparison to the broad bandwidth characteristics of the prior art OSA 9. Filter elements of the interference filter 14 shown in FIG. 7, such as Fabry-Perot filter elements are generally not uniform in optical thickness over the filter area, but rather, have contours of equal optical thickness due to presently used manufacturing processes for the filters. Narrowing of the bandwidth results from the multiple passes through the interference filter by orienting the interference filter so that the first region 14a and the second region 14b through which the optical signals pass, lie on one of the contours a, b, c, each of substantially equal optical thickness. The tilt axis A contains the midpoints of the first and second regions 14a, 14b. As the interference filter 14 is rotated about the tilt axis A, the center wavelength $\lambda_C$ varies and the optical signals pass through the regions 14a, 14b to maintain the narrow filter bandwidth characteristic over the tuning range of the interference filter.

In the preferred embodiments of the present invention, the S polarization state is chosen so as to align the electric field polarization parallel to the tilt axis A of the interference filter 14. Alternatively, the electric field polarization is chosen to be orthogonal to the tilt axis A or at another predetermined angle relative to the tilt axis A.

While two-pass configurations are shown in the preferred embodiments of the present invention, known optical elements can be included to provide a greater number of passes through the interference filter 14. Additional passes through the interference filter 14 by the optical beams in a single polarization state at regions lying on the contours of substantially equal optical thickness of the filter results in successive narrowing of the bandwidth characteristics of the interference filter in the optical spectrum analyzers.

What is claimed is:

1. An optical spectrum analyzer selective to an applied optical signal, comprising:

an interference filter having an axis of rotation, at least one contour of substantially equal optical thickness coplanar with the axis of rotation, and a center wavelength that varies according to the angle of rotation of the interference filter about the axis of rotation; and a polarization modifier including a polarizing beam splitter receiving the applied optical signal, directing a first polarization state of the applied optical signal into a first optical beam and directing a second polarization state of the applied optical signal into a second optical beam, the second polarization state orthogonal to the first polarization state, a first nonreciprocal polarization rotator receiving the first optical beam, maintaining the first polarization state of the first optical beam and directing the first optical beam through a first region of incidence on a predefined one of the at least one contour of substantially equal optical thickness of the interference filter, a retroreflector receiving the first optical beam from the first region of incidence and reflecting the first optical beam to a second region of incidence on the predefined one of the at least one contour of substantially equal optical thickness of the interference filter, a second nonreciprocal polarization rotator receiving the first optical beam from the second region of incidence in the first polarization state and rotating the polarization state of the first optical beam from the first polarization state to the second polarization state, and a reflector directing the first optical beam in the second polarization state to the output path, the reflector directing the second optical beam to the second nonreciprocal polarization rotator, which rotates the polarization state of the second optical beam from the second polarization state to the first polarization state and which directs the second optical beam through the second region of incidence, the retroreflector receiving the second optical beam from the second region of incidence and directing the second optical beam through the first region of incidence and to the first nonreciprocal polarization rotator, which maintains the polarization state of the second optical in the first polarization state and directs the second optical beam to the polarizing beam splitter which combines the second optical beam with the first optical beam at the output path.

2. The optical spectrum analyzer of claim 1 wherein the first polarization state has an electric field parallel to the axis of rotation.

3. The optical spectrum analyzer of claim 1 wherein the first polarization state has an electric field orthogonal to the axis of rotation.

4. The optical spectrum analyzer of claim 1 wherein the axis of rotation of the interference filter intersects the first region of incidence and the second region of incidence.

5. An optical spectrum analyzer selective to an applied optical signal, comprising:

an interference filter having an axis of rotation, at least one contour of substantially equal optical thickness coplanar with the axis of rotation, and a center wavelength that varies according to the angle of rotation of the interference filter about the axis of rotation; and a polarization modifier including a first walk-off crystal receiving the applied optical signal at a first surface and at a second surface directing a first polarization state of the applied optical signal into a first optical beam and directing a second polarization state of the applied optical signal into a second optical beam, the second optical beam offset spatially from the first optical beam, a first nonreciprocal polarization rotator having a first portion receiving the first optical beam and rotating polarization of the first optical beam from the first polarization state to the second polarization state, and having a second portion receiving the second beam and maintaining the second optical beam in the second polarization state, a second walk-off crystal at a first surface receiving from the first nonreciprocal polarization rotator the first optical beam and the second optical beam, and at the second surface transmitting the first optical beam and the second optical beam, a second nonreciprocal polarization rotator receiving the first optical beam and the second optical beam, maintaining the polarization state of the first optical beam and the second optical beam in the second polarization state and directing the first optical beam through a first region of incidence on a predefined one of the at least one contour of substantially equal optical thickness and directing the second beam through a second region of incidence on the predefined one of the at least one contour of substantially equal optical thickness, and a reflector, receiving the first optical beam and second optical beam from the interference filter, redirecting the first beam through the first region of incidence and to the second nonreciprocal polarization rotator and redirecting the second beam through the second region of incidence to the second nonreciprocal polarization rotator, wherein the second nonreciprocal polarization rotator rotates the polarization state of the first optical beam and the second optical beam from the second polarization state to the first polarization state and directs the first optical beam and the second optical beam to the second walk-off crystal, the second walk-off crystal spatially offsetting the first optical beam and the second optical beam and directing the first optical beam to the first portion of the first nonreciprocal polarization rotator which maintains the polarization of the first optical beam in the first polarization state, and directing the second optical beam to the second portion of the first nonreciprocal polarization rotator which rotates the polarization of the second optical beam from the first polarization state to the second polarization state, the first walk-off crystal receiving the first optical beam and the second optical beam at the second surface and at the first surface combining the first optical beam with the second optical beam at the output path.

6. The optical spectrum analyzer of claim 5 wherein the axis of rotation of the interference filter intersects the first region of incidence and the second region of incidence.

7. The optical spectrum analyzer of claim 5 wherein the second polarization state has an electric field parallel to the axis of rotation.

8. The optical spectrum analyzer of claim 5 wherein the second polarization state has an electric field orthogonal to the axis of rotation.

9. The optical spectrum analyzer of claim 5 further comprising a first thermally expanded core fiber supplying the applied optical signal to the first walk-off crystal and a second thermally expanded core fiber receiving the combined first beam and second beam from the first walk-off crystal at the output path.

10. The optical spectrum analyzer of claim 9 further comprising a collimating lens positioned between the interference filter and the reflector.

* * * * *